United States Patent
Pickens et al.

(10) Patent No.: US 6,238,633 B1
(45) Date of Patent: *May 29, 2001

(54) PROCESS FOR PREPARING CALCIUM ALUMINATE FROM ALUMINUM DROSS

(75) Inventors: John W. Pickens, Strongsville; Edward L. Morris, Brunswick, both of OH (US)

(73) Assignee: Aluminum Waste Technology, Inc., Streetsboro, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/885,913

(22) Filed: Jun. 30, 1997

(51) Int. Cl.⁷ .................. C01F 1/00; C01F 3/00; C01F 7/00; C01G 15/00
(52) U.S. Cl. ................ 423/111; 423/155; 423/600; 501/153; 501/154; 501/155; 106/692; 106/693; 106/753; 75/303; 75/416; 75/568; 75/570
(58) Field of Search .................. 423/111, 600, 423/115, 155; 501/155, 118, 153, 154; 75/416, 303, 570, 568, 672; 264/64; 106/693, 753, 692

(56) References Cited

U.S. PATENT DOCUMENTS

| 4,033,782 | 7/1977 | Ray et al. ............... 106/104 |
| 4,395,282 | 7/1983 | Braun et al. ............ 75/58 |
| 4,490,173 | 12/1984 | Schwer ................... 75/58 |
| 5,102,453 | 4/1992 | Yerushalmi .............. 75/416 |
| 5,132,246 | 7/1992 | Brisson et al. .......... 501/96 |
| 5,135,565 | 8/1992 | Gens ..................... 75/10.21 |
| 5,203,908 | 4/1993 | Lindsay .................. 75/10.35 |
| 5,227,143 | 7/1993 | Stewart, Jr. et al. ..... 423/197 |
| 5,308,375 | 5/1994 | Lindsay .................. 75/10.21 |
| 5,385,601 | 1/1995 | Kemeny et al. ........... 75/748 |
| 5,407,459 | 4/1995 | Breault et al. .......... 75/303 |
| 5,424,260 | 6/1995 | Yerushalmi et al. ....... 501/155 |
| 5,447,548 | 9/1995 | Lindsay .................. 75/10.21 |
| 5,540,752 | 7/1996 | Spoel .................... 75/380 |
| 5,603,759 | 2/1997 | Burkhart ................. 106/692 |
| 5,613,996 | 3/1997 | Lindsay .................. 75/10.21 |

FOREIGN PATENT DOCUMENTS

| 0733591 | 9/1996 | (EP) ............... C01F/7/16 |
| 0753491 | 1/1997 | (EP) ............... C04B/35/44 |
| 8290951 | 11/1996 | (JP) ............... C04B/28/02 |
| 9508516 | 3/1995 | (WO) .............. C04B/35/44 |

OTHER PUBLICATIONS

Light Metals 1995, Proceedings of the technical sessions presented by the TMS Light Metals Committee at the 124th TMS Annual Meeting, Las Vegas, Feb. 12–16, 1995, pp. 823–827.

Castelijns, C.A.M. et al, The Re–Use of Non–Metallic Products Obtained from Salt Free Aluminum Dross Recycling.

*Primary Examiner*—Steven P. Griffin
*Assistant Examiner*—Cam N. Nguyen
(74) *Attorney, Agent, or Firm*—Andrew Alexander

(57) ABSTRACT

A non-metallic product (NMP) substantially free of metallic aluminum and aluminum nitride which is utilized for making calcium aluminate.

20 Claims, 2 Drawing Sheets

PROCESS FOR PREPARING CALCIUM ALUMINATE FROM ALUMINUM DROSS

BACKGROUND OF THE INVENTION

This invention relates to aluminum dross and more particularly, it relates to the use of oxide products or non-metallic products (NMP) recovered from aluminum dross.

Aluminum dross results from the melting of aluminum scrap such as used beverage containers, aluminum siding, castings and the like and treating the melt with salt flux. The salt flux accumulates on top of the melt and forms a dross or skim which contains aluminum, oxides of aluminum and elements such as magnesium and silicon and other alloying elements present in the various alloys. Further, the skim contains other non-metallic products or compounds of the aluminum and alloying elements. The dross is removed or skimmed from the melt and processed usually to recover the metallic aluminum occluded in the oxides and non-metallic compounds. The aluminum can constitute 5 to 70% of the dross. Usually, the aluminum, which is considered the most valuable component, is recovered from the solidified dross by first fracturing the dross, for example, by mechanical milling and screening out the aluminum. Thereafter, fractured dross is heated in the presence of additional salt flux to free metallic aluminum. The molten salt flux aids in releasing molten aluminum from the dross. The salt flux is usually comprised of sodium chloride and potassium chloride. After a major portion of metallic aluminum is removed, the dross is comprised of three major components which are aluminum, salt flux and an insoluble constituent comprised largely of aluminum oxide, silicon oxide and magnesium oxide, and other non-metallic compounds often referred to as salt cake. The three components can be present in the ranges of about 3 to 25 wt. % aluminum, 25 to 50 wt. % salt flux and 25 to 75 wt. % NMP. The NMP is comprised mainly of compounds such as oxides of aluminum, silicon and magnesium. Also, included in the salt cake are minor amounts of oxides and other compounds of titanium, copper, zinc, sulfur, potassium and sodium which constitute part of the NMP. The titanium, copper and zinc compounds, e.g., oxides, can be present from alloying elements in the aluminum scrap. It is desirable to recover all useful constituents from the salt cake. Thus, the salt cake is treated to recover the salts, the insoluble constituents or non-metallic product and any remaining aluminum metal. In particular, for purposes of the present invention, it is highly desirable to recover an NMP substantially free of aluminum metal or aluminum nitride.

The salt cake can be advantageously treated in accordance with the procedures set forth in U.S. Pat. Nos. 5,102,453 and 5,227,143. However, even after such treatment, there remains the insoluble constituent or non-metallic product. U.S. Pat. No. 5,102,453 discloses the problems attendant the presence of magnesium from magnesium-containing alloys and the problems resulting from the addition of magnesium chloride to the recovery system. Namely, such addition increases the overall amount of magnesium chloride contained in the unrecoverable material or non-metallic product and even when disposed of in plastic film-lined landfills, problems still result. Thus, often the process of leaching the salt cake is not optimized to avoid disposal problems with non-metallic product.

Thus, it will be seen that there is a great need for a process that enables the recovery of the non-metallic product thereby recovering all the constituents from the aluminum dross and avoiding any dumping of NMP in landfills. The present invention provides such a process.

SUMMARY OF THE INVENTION

It is an object of the present invention to provide an improved process for treating salt cake.

It is another object of the invention to provide an improved process for recovering salts and non-metallic product from salt cake.

Yet, it is another object of the present invention to recover both the salts and the NMP from salt cake.

And yet, it is another object of the present invention to provide a process for treating salt cake to recover all the components therein and provide an NMP substantially free of aluminum metal and aluminum nitride and form aluminate from the NMP.

In accordance with these objects there is provided a process for preparing a calcium aluminate product from a salt-containing aluminum dross containing aluminum metal, water-insoluble material and fluxing compounds. The process comprises crushing the salt-containing aluminum dross and separating the aluminum metal therefrom. The crushed dross is treated in a digester with water to dissolve water-soluble compounds contained therein to provide an aqueous solution containing both soluble and insoluble materials. The aqueous solution containing soluble materials is separated from the insoluble material to provide a separate solution. Thereafter, the separated solution may be evaporated to crystallize fluxing compounds and to provide an evaporator liquor containing magnesium chloride. A part of the evaporator liquor may be recycled back to the digester in an amount sufficient for the magnesium chloride contained therein to control the pH of the materials in the digester. A body of NMP is recovered from the insoluble material. A major portion of the NMP is comprised of aluminum compounds, e.g., $Al_2O_3$, and a minor portion is comprised of compounds of silicon and magnesium, for example, oxides of silicon and magnesium. The NMP recovered is substantially free of aluminum metal and aluminum nitride. A source of calcium oxide is added to the NMP to provide a blend, the blend is formed into discrete bodies which are heated to a temperature in the range of about 2000° F. (1093° C.) to 2300° F. (1260° C.) to form the calcium aluminate product.

DETAILED DESCRIPTION OF THE PREFERRED EMBODIMENTS

Secondary aluminum dross of the type contemplated by the invention described herein consists of dross recovered from processes in which aluminum scrap has been melted to prepare reusable metal in the form of aluminum ingots, while tertiary aluminum dross consists of dross recovered from furnaces employed in recovering the secondary dross, both materials being sometimes referred to herein as "dross". Such dross is to be distinguished from dross produced in the process of preparing the original metal by electrolytic means. Although useful in any secondary or tertiary dross leaching-type recovery process such as the one described herein, the invention is particularly useful in the recovery of aluminum dross containing, for example, large amounts of magnesium chloride derived from the reclamation of used beverage cans. In this regard, beverage cans must have stiffened lids if the pull tabs commonly employed for opening them are to be operable. Such stiffness requires the use of high-magnesium content aluminum alloys for their fabrication; consequently, the invention is particularly applicable to dross obtained from recycled beverage cans which contains large amounts of magnesium chloride for the reasons mentioned. It will be understood, however, that the invention has application to all kinds of dross.

Depending upon its source, and on a weight basis, secondary dross and salt cake will contain 3% to 25% aluminum; 25% to 50% fluxing material, and 25% to 75% NMP. The fluxing material comprises substantially equal weight amounts of sodium chloride and potassium chloride, since a eutectic mixture is formed in that ratio which melts at about 1384° F., compared to 1474° F. for the sodium salt and 1422° F. for the potassium salt. The use of the eutectic allows minimal super-heating of the aluminum, which melts at about 1220° F. to reduce the flux to its operable molten condition.

The process results in the recovery of the flux salt in substantially the eutectic ratio, a form in which it can be re-used for fluxing purposes, as well as of pure aluminum. Also recovered is a product comprising a high proportion of aluminum metal fines and aluminum oxide, known in the industry as "exotherm", which is useful as an exothermic topping in steel manufacture because of its heat-producing and heat-retention characteristics.

The remaining product of the process is the non-metallic NMP, which in the past has been disposed of in a landfill operation.

Figure 1:
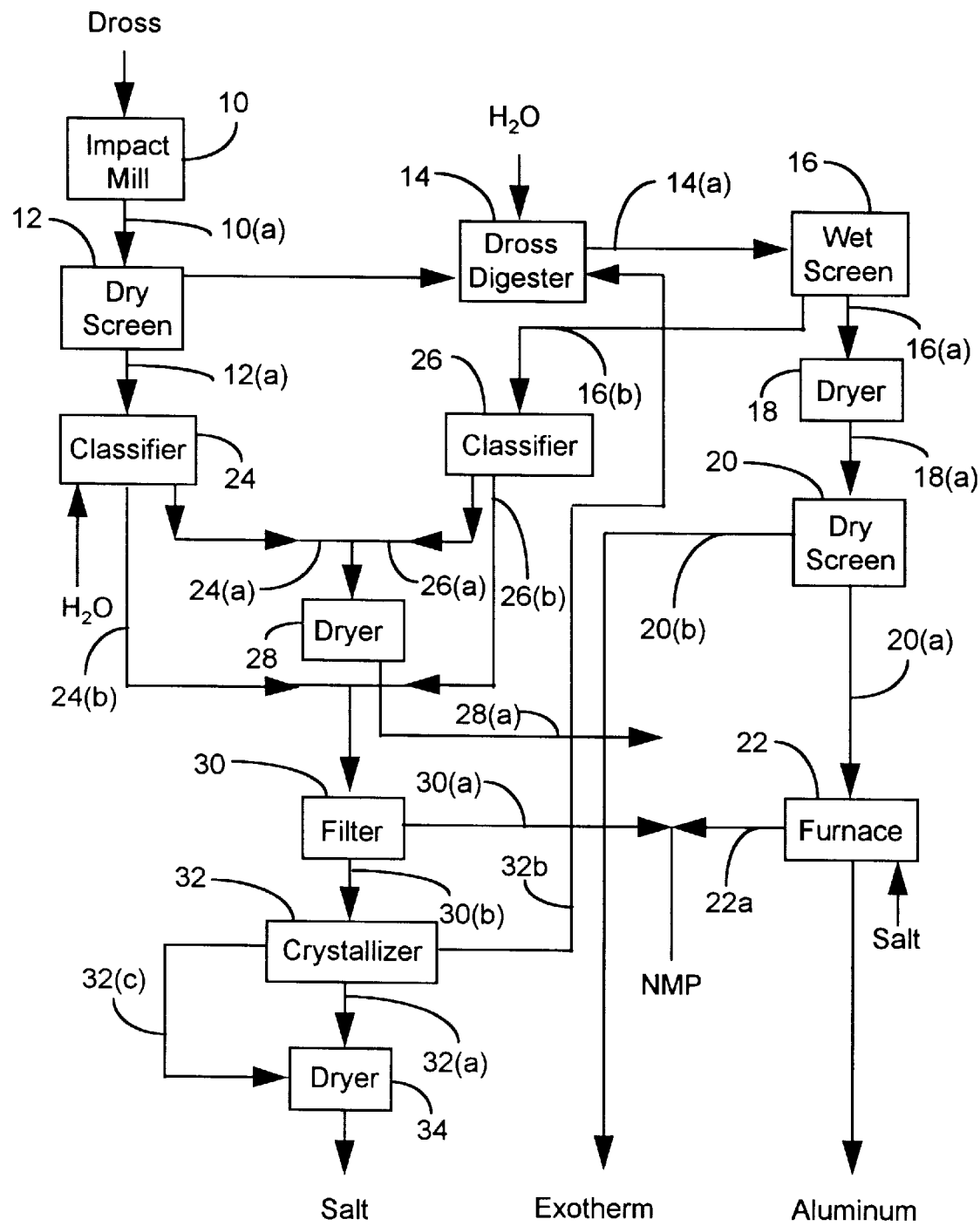
FIG. 1 is a schematic flow diagram of the aluminum dross recovery process showing salt, NMP and aluminum recovery.
Figure 2:
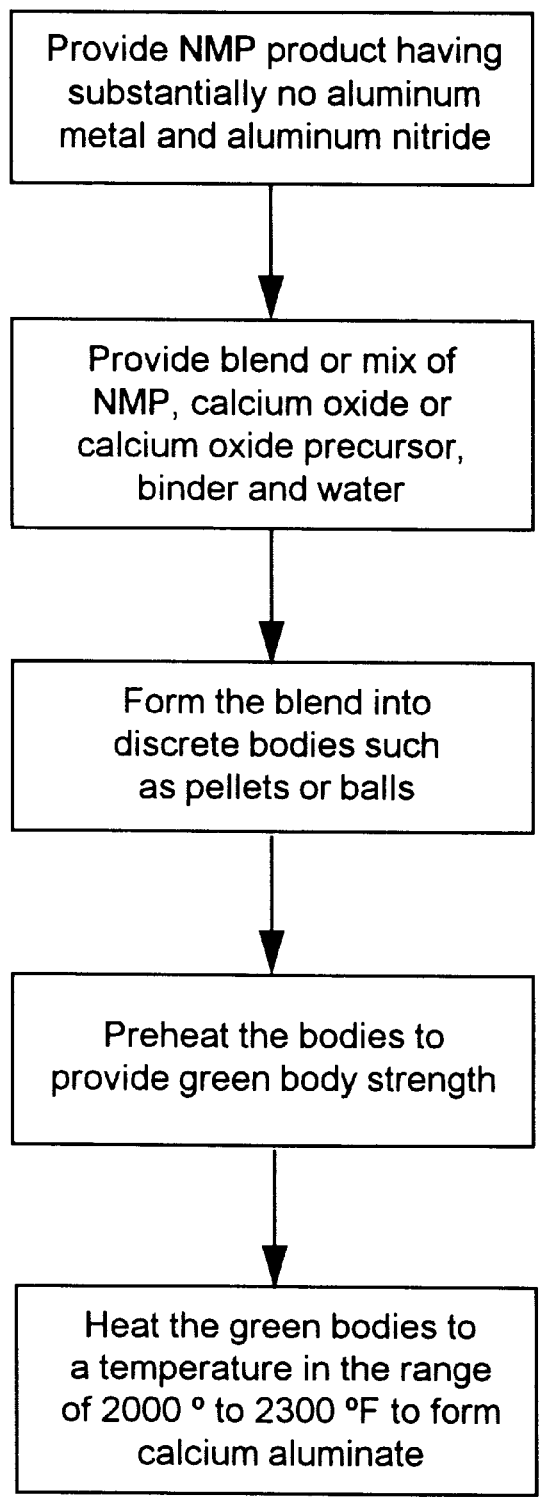
FIG. 2 is a schematic flow chart showing steps in processing the NMP into a useful product.

Referring now to FIG. 1, the dross is initially processed through a crusher, for example, a ball mill or equivalent device 10, where the received dross is fragmented. The reduced fragments 10(a) are then passed over a screen 12 where size classification of the fragments is carried out. Commonly, at least two fractions are produced, one containing fines, typically below −10 mesh. The other fraction, usually representing up to 80% of the crushed material and known as "middlings", ranges from about −4 to +10 mesh. Pieces larger than four inches can serve as furnace feed without further processing, provided they contain sufficient aluminum content; otherwise, they are recycled to the crusher 10.

Each of the streams, the fines and the middlings, are processed separately in order to maximize recovery of the aluminum content thereof.

The middling stream 12(b) is fed to a dross digester 14 to which water is introduced. The digester can be any suitable vessel capable of holding the dross middlings and the water introduced therein for purposes of leaching the dross solubles. However, it has been advantageous to employ agitated mixers of the type normally carried on concrete trucks since they are readily available and relatively inexpensive, besides possessing the necessary physical characteristics to carry out the leaching operation.

In order to suppress the reactions previously referred to so as to minimize the unwanted production of ammonia, methane, hydrogen, hydrogen sulfide and other noxious products, the leaching operation is carried out in digester 14 at a pH below about 8. In addition, and preferably, the pH is controlled above 5 since below that figure, the digester contents are so acidic that severe corrosion of the equipment is produced.

While the magnesium chloride naturally present in the dross would, in the normal course of the digestion, be sufficient to restrain the pH of the digester contents from rising, some of the magnesium chloride is converted to magnesium hydroxide, which being insoluble, is precipitated from solution. Thus, the contents of the digester become more basic, a condition which favors the creation of still more of the hydroxide, reinforcing the tendency of the digester contents to become so basic that the unwanted reactions referred to are promoted, rather than eliminated.

To avoid the overly-basic condition, it has been found that the introduction into the digester of magnesium chloride containing liquor from the evaporator-crystallizer 32, which shall be described in greater detail in the following, can maintain the pH in the range of from about 5 to about 8 without the addition of extraneous magnesium chloride to the system, the disadvantage of which has already been described. In carrying out the pH adjustment, samples of the digester's contents are periodically subjected to pH analysis and evaporator liquor 32(b) is added, as required, to maintain the pH of the digester in the desired range. Digestion times will vary, depending upon the character of the dross being treated; normally however, the digestion will last from about twenty minutes to one hour.

Following solution of the solubles in the digester 14, its contents 14(a) are fed as a slurry to a wet screening operation with a wet screen 16 which divides the digested materials into one fraction containing coarse particles, for instance, +20 mesh, and a stream of fine particles of about −20 mesh. The coarse particles 16a, which contain a relatively high metallic aluminum content and some aluminum oxide and other non-metallic compounds are sent to a dryer 18, which may be a rotary drum dryer, where the material is dried. The dried material 18(a) is then passed to a dry screen 20 where the material is divided into a coarse fraction of about +8 mesh, and a fines fraction approximately −8 mesh. The coarse fraction 20(a) is passed to a furnace 22, where the material is covered with a layer of flux salt, which acts as an insulating layer, and heated to a temperature sufficient to melt the free aluminum present, the metal then being tapped from the furnace and cast into aluminum ingots. The balance of the material 22(a) constitutes non-metallic product which is removed from the furnace.

Referring again to the wet screening operation at wet screen 16, the fines there obtained are removed as a slurry 16(b), rather than being furnaced, so that any aluminum present in the fines does not combine with oxygen in the furnace to produce unwanted aluminum oxide.

The slurry 16(b) is sent to a classifier 26 where substantially all remaining aluminum metal is removed from the NMP in the slurry. Solids 26(a) from the classifier are fed to a dryer 28, for example, of the rotary drum type, where they are dried and forwarded as exotherm product 28(a) to storage.

Again referring to dry screen 12, the fines 12(a) therefrom are fed to a classifier 24 or combined with water therein, the classifier in effect functioning as an additional digester. It is unnecessary to control the pH in the classifier 24 since the solids entering the classifier contain minimal aluminum, and therefore, the unwanted side reactions referred to are not a serious problem. The amount of water introduced into classifier 24 is deliberately maintained at a minimum, as is the water added to dross digester 14, in order to reduce the amount of water that must ultimately be removed in the crystallization operation described in the following. The solids 24(a) discharged from classifier 24 are also fed to dryer 28 and the resulting exotherm product sent to storage.

The liquids or slurries 24(b) and 26(b) leaving the classifier 24 and 26, respectively, are processed in a filter 30, which may be a rotary drum filter employing diatomaceous earth as a filter aid, or it may be some other type of filter such as a filter press, or an equivalent of the preceding. However, the slurries may be subjected to processing steps such as thickening, classification, chemical treatment and washing, and filtration steps as required. The solid cake obtained from the filter 30(a) after being discharged therefrom is collected as NMP. The NMP may be used as-is in some applications or it may be subjected to pyrometallurgical treatments for other applications. Suppression of the unwanted reactions referred to in connection with the dross digester 14 has a further beneficial affect in that it permits filter 30 to operate at lower temperatures, and thus more satisfactorily than would otherwise be the case. The liquid 30(b) from the filter is introduced into a crystallizer 32 where the water is evaporated and the flux salts crystallized.

A portion of the liquor in the crystallizer 32 may be transferred as a side stream 32b, normally containing about 8 wt. % to 9 wt. % of magnesium chloride back to the dross digester 14 to act as a pH control, as previously described. The crystallizer may be any one of the many types available in the market.

The crystallizer normally operates at a temperature of about 235° F. to 236° F., a temperature at which the flux salt gradually precipitates from solution. Were it not removed, however, the continual addition of the magnesium chloride contained in the brine fed to the crystallizer would raise the boiling point of the liquor and result in the temperature of the crystallizer rising, for example to about 243° F., a point at which the magnesium chloride would then also precipitate from solution. Such a temperature, however, would result in problems being experienced with the crystallization operation, among other things, due to the fact that the high temperature would cause shutdown of the compressor used in conjunction with the crystallization system. This difficulty is overcome, however, not only by removal of the magnesium chloride stream 32(b) recycled to the dross digester 14, but also by a further side stream 32(c) removed from the crystallizer. Preferably in this regard, the magnesium chloride present in the crystallizer is controlled by withdrawal of such streams in amounts such that the magnesium chloride present in the crystallizer does not exceed about 3 wt. % to 7 wt. %, a concentration at which the temperature of the crystallizer can be maintained at about 235° F. to 236° F. The fluxing salts 32(a) recovered from the crystallizer 32 are sent to a dryer 34 wherein the salts are dried and forwarded to storage. The stream 32(c) from the crystallizer also discharges into the dryer, the magnesium chloride thereby being removed from the system, or it can otherwise be disposed of.

The amount of NMP produced from dross or skim can range from 25 wt. % to 75 wt. % of the total dross processed, depending to some extent on the nature of the dross being processed. Thus, while other processes were selected carefully to minimize the amount of NMP, any process may be used to treat the dross because all the end products resulting from the process can be used. Further, the present invention permits the use of any aluminum dross.

For purposes of the present invention, it is preferred that the NMP comprises about 40 wt. % to 75 wt. % $Al_2O_3$, 0 wt. % to 20 wt. % MgO, and 2 to 15 wt. % $SiO_2$, the remainder may be comprised of oxides and compounds of Ti, Cu, Zn, K, S, Ca and Na and other trace elements. It will be appreciated that other aluminum, magnesium and/or silicon compounds can be present. The NMP of the present invention comprises less than 1 wt. % and preferably 0.5 wt. % each of aluminum metal and aluminum nitride. Preferably, the NMP comprises about 50 wt. % to 75 wt. % $Al_2O_3$, 1 wt. % to 18 wt. % MgO, and 3 to 12 wt. % $SiO_2$ with a typical amount being about 54 wt. % $Al_2O_3$, 11 wt. % MgO, 4 wt. % $SiO_2$, 5.6 wt. % CaO, 3 wt. % $TiO_2$, and about 2 wt. % $Fe_2O_3$. In addition, the NMP can contain up to 0.3 wt. % S, up to 5 wt. % C, up to 2 wt. % Cl and have an LOI (weight loss on ignition due mainly to removal of water) of about 20 wt. %. The LOI can range from 5 to 35 wt. % at 1400° C. The use of $Al_2O_3$ herein is meant to include all the aluminum oxide forms present in the NMP. Similarly, the use of MgO or $SiO_2$ is meant to include other oxide forms. Also, LOI referred to herein is meant on a dry basis. That is, the NMP is substantially free of free water and the LOI reflects chemically bound water. While not wishing to be bound by any theory of invention, it is believed that the LOI is important in promoting mass transfer during calcination and oxidation reactions.

The NMP recovered from the dross treatment is usually in the form of filter cake and can contain up to about 50 wt. % $H_2O$. If dried the NMP would have a particle size that would pass through a 20 mesh, Standard Sieve. Thus, normally, the NMP can be used in the condition as removed from the dross treatment.

Chemical analysis for NMP from secondary salt drosses processed in accordance with the system are provided in Table 1. Also provided are mineralogical phase information on the character of the NMP after front end processing is complete. The NMP produced in accordance with the invention is substantially free of aluminum metal and aluminum nitride. That is, the aluminum metal and nitrogen contents of NMP dross residue produced in accordance with the invention are extremely low. By substantially free is meant that nitrogen can range from 0.1 to 0.5 wt. % and typically no more than about 1 wt. % aluminum metal and nitrogen. Nitrogen is on the order of only ~0.2 wt. %. A further feature of the process is the presence of a major amount of amorphous material in the NMP. It is believed that this may be an amorphous alumina precursor phase. The amorphous aluminum bearing phase, which once calcined, can become alpha alumina (corundum). Wet digestion performed in the process is believed to produce a hydrated amorphous phase. Measured chemically bound hydrated water in some samples has accounted for about 10% of the NMP sample weight.

TABLE 1

380 Alloy Type Dross
Composition of NMP Dross Residues

| | ELEMENTAL BASIS | | | | | | | OXIDE BASIS | | | | | |
|---|---|---|---|---|---|---|---|---|---|---|---|---|---|
| | After Calcine | | | Before Calcine | | | | After Calcine | | | Before Calcine | | |
| | I | II | III | I | II | III | | I | II | III | I | II | III |
| Na | 0.26 | 0.23 | 0.21 | 0.21 | 0.19 | 0.18 | $Na_2O$ | 0.35 | 0.3 | 0.28 | 0.29 | 0.25 | 0.24 |
| Mg | 9.13 | 9.29 | 8.69 | 7.53 | 7.65 | 7.31 | MgO | 15.14 | 15.4 | 14.4 | 12.48 | 12.68 | 12.11 |
| Si | 4.41 | 3.66 | 4.99 | 3.64 | 3.01 | 4.20 | $SiO_2$ | 9.43 | 7.82 | 10.67 | 7.78 | 6.44 | 8.97 |
| K | 0.18 | 0.12 | 0.22 | 0.15 | 0.10 | 0.19 | $K_2O$ | 0.22 | 0.15 | 0.26 | 0.18 | 0.12 | 0.22 |
| Ca | 0.90 | 1.92 | 1.64 | 0.74 | 1.58 | 1.38 | CaO | 1.26 | 2.68 | 2.3 | 1.04 | 2.21 | 1.93 |
| Ti | 0.52 | 0.89 | 1.05 | 0.43 | 0.73 | 0.88 | $TiO_2$ | 0.87 | 1.48 | 1.75 | 0.72 | 1.22 | 1.47 |
| Cr | 0.08 | 0.09 | 0.08 | 0.07 | 0.07 | 0.07 | $Cr_2O_3$ | 0.11 | 0.13 | 0.12 | 0.09 | 0.11 | 0.10 |
| Mn | 0.18 | 0.18 | 0.19 | 0.15 | 0.15 | 0.16 | MnO | 0.23 | 0.23 | 0.25 | 0.19 | 0.19 | 0.21 |
| Fe | 1.73 | 1.48 | 1.49 | 1.43 | 1.22 | 1.25 | $Fe_2O_3$ | 2.48 | 2.11 | 2.14 | 2.04 | 1.74 | 1.80 |
| Zr | 0.02 | 0.01 | 0.01 | 0.02 | 0.01 | 0.01 | $ZrO_2$ | 0.03 | 0.02 | 0.01 | 0.02 | 0.02 | 0.01 |

TABLE 1-continued

| | | | | | | | | | | | | | |
|---|---|---|---|---|---|---|---|---|---|---|---|---|---|
| Al | 36.27 | 36.64 | 35.80 | 29.90 | 30.16 | 30.11 | Al$_2$O$_3$ | 68.53 | 69.23 | 67.65 | 56.50 | 56.99 | 56.90 |
| P | 0.09 | 0.06 | 0.06 | 0.07 | 0.05 | 0.04 | P$_2$O$_5$ | 0.2 | 0.14 | 0.12 | 0.16 | 0.12 | 0.10 |
| Ni | 0.05 | 0.02 | 0.02 | 0.04 | 0.02 | 0.02 | NiO | 0.06 | 0.03 | 0.03 | 0.05 | 0.02 | 0.03 |
| Cu | 0.67 | 0.52 | 0.59 | 0.55 | 0.43 | 0.50 | CuO | 0.84 | 0.65 | 0.74 | 0.69 | 0.54 | 0.62 |
| S | | | | 0.18 | 0.15 | 0.18 | | | | | | | |
| C | 0.006 to 0.012 | | | 2.23 | 1.92 | 2.02 | | | | | | | |
| % LOI | 0.00 | 0.00 | 0.00 | 17.55 | 17.68 | 15.89 | | 0.00 | 0.00 | 0.00 | 17.55 | 17.68 | 15.89 |

Aluminum & nitrogen analysis:

As-Processed Before Calcining:

Aluminum Metal Content = 0.35 to 1.14 wt. %
Nitrogen Content = 0.17 to 0.22 wt. %
Chemically Bound, Hydrate Radicals = 8.6 to 10.4 wt. %
After Calcining:

Aluminum Metal Content = <0.01 to 0.05 wt. %
Nitrogen Content = 0.0050 to 0.0115 wt. %

Mineralogical Phase analysis:

As-Processed Before Calcining:

MgAl$_2$O$_4$ Spinel — #1 major
Al$_2$O$_3$ Corundum — #2/3 moderate/major
SiO$_2$ Quartz — #2/3 moderate/major
CaF$_2$ Fluorite — low CaCO$_3$ — low
CaMg(CO$_3$)$_2$ — low
KAlSi$_3$O$_8$ — low/moderate
Amorphous phase present Because the NMP of the invention is substantially free of aluminum metal and aluminum nitride, it has the advantage that such materials do not melt readily to form clinkers. Thus, calcium aluminate can be formed substantially free of clinkers. Often, clinkers are undesirable because their formation adversely affect the formation of calcium aluminate, the ease of melting and fluidity of the calcium aluminate on application to steel treatment, for example. Clinkers are agglomerations of pellets formed during calcination in the kiln and are undesirable.

The composition of NMP in dross also varies as a function of the type of aluminum alloy from which it is derived. Elements present in the metal alloy are reflected in the NMP chemical composition. Tables 1 and 2 are examples and each reflect a type of dross which is derived from a respective family of metal alloys and are illustrative of the components derived from certain drosses.

Tables 1 and 2 provide compositions of NMP which result from processing secondary salt drosses and saltcake. The NMP is blended with CaO or its precursor, i.e. a source of CaO, to make calcium aluminate. It is denoted as "Before Calcine". As such, it contains bound water and has an LOI (loss on ignition) on the order of 15–18% for 380 type NMP (Table 1) and 20–22% for the de-ox type (Table 2). The LOI can range from 5 to 25 wt. % at 1400° C. The composition of the NMP after complete calcining to 0% remnant LOI is denoted "After Calcine". In manufacturing calcium aluminate, the NMP is mixed with the other ingredients in the uncalcined state, and becomes calcined during the high temperature kiln treatment to form the calcium aluminate product.

TABLE 2

DE—OX Alloy Type NMP
Composition of NMP Dross Residues

| | ELEMENTAL BASIS | | | | | OXIDE BASIS | | | |
|---|---|---|---|---|---|---|---|---|---|
| | After Calcine | | Before Calcine | | | After Calcine | | Before Calcine | |
| | I | II | I | II | | I | II | I | II |
| Na | 0.15 | 0.24 | 0.12 | 0.19 | Na$_2$O | 0.19 | 0.33 | 0.15 | 0.26 |
| Mg | 8.06 | 7.49 | 6.48 | 5.83 | MgO | 13.36 | 12.41 | 10.74 | 9.65 |
| Si | 2.33 | 3.24 | 1.87 | 2.52 | SiO$_2$ | 4.98 | 6.92 | 4.00 | 5.38 |
| K | 0.04 | 0.13 | 0.03 | 0.10 | K$_2$O | 0.05 | 0.16 | 0.04 | 0.12 |
| Ca | 3.29 | 33.32 | 2.64 | 25.92 | CaO | 4.60 | 4.65 | 3.70 | 3.62 |
| Ti | 0.86 | 1.3 | 0.69 | 1.01 | TiO$_2$ | 1.44 | 2.17 | 1.16 | 1.69 |
| Cr | 0.08 | 0.08 | 0.06 | 0.06 | Cr$_2$O$_3$ | 0.12 | 0.12 | 0.10 | 0.09 |
| Mn | 0.12 | 0.15 | 0.10 | 0.12 | MnO | 0.16 | 0.19 | 0.13 | 0.15 |
| Fe | 1.89 | 2.28 | 1.52 | 1.77 | Fe$_2$O$_3$ | 2.70 | 3.26 | 2.17 | 2.54 |
| Zr | 0.01 | 0.01 | 0.01 | 0.01 | ZrO$_2$ | 0.01 | 0.01 | 0.01 | 0.01 |
| Al | 38.28 | 36.94 | 30.77 | 28.73 | Al$_2$O$_3$ | 72.33 | 69.81 | 58.15 | 54.30 |
| P | 0.07 | 0.07 | 0.06 | 0.05 | P$_2$O$_5$ | 0.16 | 0.16 | 0.13 | 0.12 |
| Ni | | | 0.00 | 0.00 | NiO | 0.04 | 0.04 | 0.03 | 0.03 |
| Cu | | | 0.00 | 0.00 | CuO | 0.41 | 0.45 | 0.33 | 0.35 |
| S | <0.01 | <0.01 | 0.24 | 0.24 | | | | | |
| C | NYA | NYA | 4.75 | 4.48 | | | | | |
| % LOI | 0.00 | 0.00 | 19.61 | 22.22 | | 0.00 | 0.00 | 19.61 | 22.22 |

Aluminum & nitrogen analysis:

As-Processed Before Calcining:

Aluminum Metal Content = 0.24 wt. %

Mineralogical Phase analysis:

As-Processed Before Calcining:

MgAl$_2$O$_4$ Spinel — #1 major

TABLE 2-continued

| | |
|---|---|
| Nitrogen Content = 0.2 wt. % | $Al_2O_3$ Corundum — #2 major |
| | $CaCO_3$ Calcite — #3 moderate |
| | $CaF_2$ Fluorite — #4 moderate |
| | $MgF_2$ Sellaite — #5 moderate |
| | $SiO_2$ Quartz — #6 low |
| | Several faint unidentified peaks |
| | Amorphous phase presence |

Prior to being blended with a source of calcium oxide, the NMP can be treated chemically as in U.S. Pat. Nos. 5,424,260, 5,102,453 and 5,211,922, incorporated herein by reference, and then thoroughly washed to remove remnant chemicals and salts. Thereafter, the processed NMP is mixed in specified proportion with calcium oxide (CaO) or an appropriate precursor such as calcium hydroxide or calcium carbonate. The proportions used depend on the desired composition of the final calcium aluminate bearing product. Different ratios of calcium oxide to aluminum oxide may be used, depending on the end use and the compositions of other ladle additives and blended materials. The present process allows production of calcium aluminate product to match any of these end needs. Table 3 shows a range of possible calcium aluminate product compositions which can be achieved by mixing typical 380 type NMP with $Ca(OH)_2$. These examples are illustrative and are not by way of limitation.

In making calcium aluminate, it is preferred to use finer particle sizes (increases surface area and therefore reactivity) for more intimate mixing which is beneficial. This results in a greater degree of reaction between alumina and calcium oxide. The particle size of the NMP typically ranges from +400 to about −18 mesh (U.S. Sieve Series), and the particle size of the calcium hydroxide is typically −50 and preferably −325 mesh (U.S. Sieve Series).

After the blend of NMP, CaO or precursor and binder is made, the blend is formed into pellets. Several pelletizing processes can be used including pan pelletized balls or extruded shapes (usually in the shape of cylinders or rods). Producing a round pellet without edges helps reduce the presence of fines from broken pellet edges. The extrusion of pellets into rods is preferred. Typically, the rods have a diameter in the range of ¼" to ¾". This produces a stronger pellet than pan ball pelletizing. The extrusion method is also less sensitive to process variables. The amount of water

TABLE 3

Potential Calcium Aluminate Compositions

| | $Al_2O_3$ | MgO | $SiO_2$ | CaO | $Fe_2O_3$ | $TiO_2$ | CuO | $Na_2O$ | $K_2O$ | S | |
|---|---|---|---|---|---|---|---|---|---|---|---|
| Composition of NMP (100# Basis) | 65.000 | 14.000 | 13.000 | 3.000 | 2.000 | 1.500 | 0.650 | 0.500 | 0.400 | 0.000 | 100.050 |
| Composition of $Ca(OH)_2$ (w/23.72% LOI) | 0.540 | 0.740 | 1.280 | 73.400 | 0.260 | 0.000 | 0.000 | 0.000 | 0.000 | 0.015 | 76.235 |
| Composition of Calcined CaO (0% LOI) | 0.708 | 0.970 | 1.678 | 96.224 | 0.341 | 0.000 | 0.000 | 0.000 | 0.000 | 0.020 | 99.941 |
| 50% NMP/50% CaO | 32.854 | 7.485 | 7.339 | 49.612 | 1.170 | 0.750 | 0.325 | 0.250 | 0.200 | 0.010 | |
| 52.5% NMP/47.5% CaO | 34.461 | 7.811 | 7.622 | 47.282 | 1.212 | 0.788 | 0.341 | 0.263 | 0.210 | 0.009 | |
| 55% NMP/45% CaO | 36.069 | 8.137 | 7.905 | 44.951 | 1.253 | 0.825 | 0.358 | 0.275 | 0.220 | 0.009 | |
| 57.5% NMP/42.5% CaO | 37.676 | 8.462 | 8.188 | 42.620 | 1.295 | 0.863 | 0.374 | 0.288 | 0.230 | 0.008 | |
| 62.5% NMP/37.5% CaO | 40.890 | 9.114 | 8.754 | 37.959 | 1.378 | 0.938 | 0.406 | 0.313 | 0.250 | 0.007 | |
| 65% NMP/35% CaO | 42.498 | 9.440 | 9.037 | 35.629 | 1.419 | 0.975 | 0.423 | 0.325 | 0.260 | 0.007 | |
| 67.5% NMP/32.5% CaO | 44.105 | 9.765 | 9.320 | 33.298 | 1.461 | 1.013 | 0.439 | 0.338 | 0.270 | 0.006 | |
| 70% NMP/30% CaO | 45.712 | 10.091 | 9.603 | 30.967 | 1.502 | 1.050 | 0.455 | 0.350 | 0.280 | 0.006 | |
| 72.5% NMP/27.5% CaO | 47.320 | 10.417 | 9.886 | 28.637 | 1.544 | 1.088 | 0.471 | 0.363 | 0.290 | 0.005 | |
| 75% NMP/25% CaO | 48.927 | 10.743 | 10.170 | 26.306 | 1.585 | 1.125 | 0.488 | 0.375 | 0.300 | 0.005 | |

To obtain these compositions, typically the blend of NMP and CaO can range from 45 to 75 wt. % NMP, the remainder CaO, incidental elements and impurities. However, broader ranges can be employed, if necessary. Further, in this specification, all ranges include all the numbers within the range as if specifically set forth.

A binder such as an inorganic or organic binder may be added to the blend of NMP and calcium oxide or precursor during mixing so that it is evenly distributed throughout. The amount of binder used should be the minimum required to accomplish production of a pellet with strength sufficient for handling and tumbling during subsequent high temperature kiln processing. Binder can range from 0.1 to 8% of the blend. An example of such a binder and level of addition would be in the range of 0.5 to 5 wt. % for calcium lignosulfonate based on the weight of the blend of NMP and CaO, for example. Other binders include sodium lignosulfate, clays such as bentonite and molasses.

present in the mixed material or blend is important in being able to produce a good quality pellet by extrusion. A preferred mix or blend containing 60% NMP and 40% $Ca(OH)_2$ can require about 30 wt. % water. However, water added to the mix can range from 25 to 45 wt. %. The mix can comprise 30 to 70 wt. % NMP and the balance CaO or precursor, incidental elements or compounds and impurities.

The strength of the pellets must be sufficient to withstand handling and treatment in the kiln. The strength can be controlled by the pelletizing process, type of binder, its amount, and the degree of drying and/or preheating of the pellet prior to being introduced to a kiln for purposes of reacting to form calcium aluminate. Preferably, the pellets are preheated or dried before being introduced to the kiln. Typically, the pellets are preheated at a temperature in the range of 300° to 1000° F. and from about 10 to 120 minutes in an air or oxidizing atmosphere. Exhaust gases from the kiln can be recirculated for purposes of drying and preheating of the pellets. This produces a pellet which has sufficient strength to resist fracturing during calcination.

The kiln is run with an oxidizing environment which may be achieved with an excess of air relative to the amount of fuel being burned. The oxidizing environment promotes the occurrence of high temperature chemical reactions within pellets during calcination. The chemical reactions produce phase changes which facilitate completion of calcination and formation of calcium aluminate.

Upon heating the blend in the kiln, a series of reactions can occur. Carbonates present in the NMP and/or the CaO precursor break down to $CO_2$. Although not wishing to be bound by any theory of invention, it is believed that chemically bound hydrate water in the NMP is driven off, most of this is believed to be associated with aluminum trihydrate or amorphous transitional alumina. It is believed that there is also some breakdown of other halogen compounds including fluorides and chlorides. Amorphous phases become crystalline and there is formation of additional phases as certain compounds present combine or form solid solutions to form other mineralogical phases.

The greater the temperature reached by the pellets, the more thoroughly reacted they become with regard to forming calcium aluminate phases. During heating, it is believed that there is progressive alloying among the components of the mixture by diffusion enhancing formation of greater proportions of calcium aluminate phases. This is a "time/temperature" dependent process. The residence time in the kiln can be held to a minimum as long as the kiln load is heated to a sufficiently high temperature. It is believed that reaction can be accomplished in a temperature range below incipient melting. This is the temperature range where solid state sintering can occur. At sufficiently high temperatures, the kiln load can begin to get sticky, and there is some evidence of pellets beginning to stick together. This denotes the point of incipient melting. Operating just under this temperature is preferred because it gives the advantage of most extensive reaction and phase formation without formation of pellet clinkers. Thus, it is preferred to provide for reaction without substantial formation of clinkers. Clinkers result from agglomeration of pellets.

A preferred temperature for operation of the kiln is over 2000° F. (1093° C.). Sticking or agglomerating can begin to occur about 2300° F. (1260° C.) and higher. Thus, a preferred range is about 2000° (1093° C.) to 2300° F. (1260° C.) and typically in the range of 1093° C. to 1193° C. It is believed that the presence of other compounds such as aluminum metal or aluminum nitride in the dross affect the sticking or agglomerating temperature range. Also, higher levels of alkali and alkaline earths can act as sintering aids in that they promote formation of lower melting phases.

The calcium aluminate product is comprised of $XCaCO.YAl_2O_3$ where X is in the range of 1 to 12 and Y is in the range of 1 to 7.

Calcium aluminate for the steel industry is used mainly in refining higher quality steels to remove undesirables such as sulfur. Also, compositions of the calcium aluminate can be used to adjust viscosity and as well the character of the slag cover. Calcium aluminate must also be compatible with furnace refractory or ladle linings. Often processing is carried out in the ladle such as an LMF, Ladle Metallurgy Furnace. The use of this technique is increasing due to several factors: demand for higher quality steels, increases in the presence of steel minimills, and efficiency in productivity. Improved quality in calcium aluminate products results in minimal dusting, product strength, product shape, consistency and reproducibility of overall chemical composition. Also, it includes ease of melting and good fluidity. In addition, a low melting range and quicker melting response once the product is placed onto the surface of the molten steel in the ladle is important. This speeds the steel refining process. The melting temperature of one calcium aluminate product produced in accordance with the invention is about 1360° C. (2480° F.). The eutectic for pure $CaO—Al_2O_3$ is about 1350° C. The melting temperature of the product in accordance with the invention is therefore excellent. The improved calcium aluminate provides beneficial cover slag character with little or no damage to ladle or furnace refractories.

In addition, the presence of MgO is beneficial in protecting basic refractories, due to wide use of basic steel making processes and refractories such as MgO in furnace linings.

What is claimed is:

1. A process for preparing calcium aluminate product from a salt-containing aluminum dross containing aluminum metal, water-insoluble material and fluxing compounds, comprising:
    (a) crushing the salt-containing aluminum dross;
    (b) treating the crushed dross in a digester with water to dissolve water-soluble compounds contained therein to provide an aqueous solution containing both soluble and insoluble materials;
    (c) separating the insoluble material from the aqueous solution containing soluble materials by:
        (i) wet screening to separate a course fraction having a high metallic aluminum content from a fine fraction and aqueous solution; and
        (ii) classifying said fine fraction to remove aluminum metal therefrom and to recover aqueous solution containing NMP;
    (d) recovering a body of non-metallic product (NMP) from said aqueous solution, a major portion of the non-metallic product comprised of $Al_2O_3$ and minor portions of said body comprised of at least one of $SiO_2$ and MgO, the non-metallic product (NMP) having less than 1 wt. % each of aluminum metal and aluminum nitride and having an LOI at 1400° C. of 5 to 35 wt. %;
    (e) adding a source of calcium oxide to said body of non-metallic product (NMP) to provide a blend;
    (f) forming said blend into discrete bodies; and
    (g) heating said bodies to a temperature in the range of about 1093° to 1193° C. to form said calcium aluminate product without said bodies forming agglomerates.

2. The process in accordance with claim 1 wherein the NMP comprises 40 to 75 wt. % $Al_2O_3$, about 0 to 20 wt. % MgO and about 2 to 15 wt. % $SiO_2$.

3. The process in accordance with claim 1 wherein the non-metallic product comprises 50 to 75 wt. % $Al_2O_3$, 1 to 18 wt. % MgO and 3 to 12 wt. % $SiO_2$.

4. The process in accordance with claim 1 wherein the non-metallic product contains up to 45 wt. % water.

5. The process in accordance with claim 1 wherein the non-metallic product contains up to 30 wt. % water.

6. The process in accordance with claim 1 wherein the non-metallic product has an LOI of 5 to 25 wt. % at 1400° C.

7. The process in accordance with claim 1 wherein the non-metallic product has an LOI of 15 to 22 wt. % at 1400° C.

8. The process in accordance with claim 1 including adding a binder to said blend, said binder selected from the group consisting of sodium lignosulfate, calcium lignosulfate and clay.

9. The process in accordance with claim 8 wherein said binder comprises 0.1 to 8 wt. % of said blend, said binder selected from the group consisting of sodium lignosulfate, calcium lignosulfate and clay.

10. The process in accordance with claim 1 including extruding said blend into pellets to form said discrete bodies.

11. The process in accordance with claim 1 including the step of preheating said discrete bodies to improve green strength prior to said heating step.

12. The process in accordance with claim 1 including the step of preheating said discrete bodies to a temperature in the range of 300° to 1000° F. to improve green strength prior to said heating step.

13. A process for preparing calcium aluminate from a salt-containing aluminum dross containing aluminum metal, water-insoluble material and fluxing compounds, comprising:

(a) treating said dross in a digester with water to dissolve water-soluble compounds contained therein to provide an aqueous solution containing both soluble and insoluble materials;

(b) separating insoluble material from the aqueous solution containing soluble materials by:

(i) wet screening to separate a course fraction having a high metallic aluminum content from a fine fraction and aqueous solution; and (ii) classifying said fine fraction to remove aluminum metal therefrom and to recover aqueous solution containing NMP;

(c) recovering a body of non-metallic product from said aqueous solution, the non-metallic product comprised of 40 to 75 wt. % $Al_2O_3$, 2 to 15 wt. % $SiO_2$, and 1 to 18 wt. % MgO, the non-metallic product having less than 1 wt. % each of aluminum metal and aluminum nitride and having an LOI at 1400° C. of 5 to 35 wt. %;

(d) adding a source of calcium oxide to said body to provide a blend;

(e) adding water to said blend to provide a mix containing up to 45 wt. % $H_2O$;

(f) forming said mix into discrete bodies;

(g) preheating said discrete bodies to improve green body strength; and (h) heating said bodies to a temperature in the range of about 1093° to 1193° C. to form said calcium aluminate product.

14. The process in accordance with claim 13 wherein the non-metallic product contains up to 30 wt. % water.

15. The process in accordance with claim 13 wherein the non-metallic product has an LOI of 10 to 25 wt. %.

16. The process in accordance with claim 13 wherein the non-metallic product has an LOI of 15 to 22 wt. %.

17. The process in accordance with claim 13 including adding a binder to said blend, said binder selected from the group consisting of sodium lignosulfate, calcium lignosulfate and clay.

18. The process in accordance with claim 13 including the step of preheating said discrete bodies to improve green strength prior to said heating step.

19. A process for preparing calcium aluminate product from a salt-containing aluminum dross containing aluminum metal, water-insoluble material and fluxing compounds, comprising:

(a) crushing the salt-containing aluminum dross;

(b) treating the crushed dross in a digester with water to dissolve water-soluble compounds contained therein to provide an aqueous solution containing both soluble and insoluble materials;

(c) separating the aqueous solution containing soluble materials from the insoluble material by:

(i) wet screening to separate a course fraction having a high metallic aluminum content from a fine fraction and aqueous solution; and (ii) classifying said fine fraction to remove aluminum metal therefrom and to recover aqueous solution containing NMP;

(d) recovering a body of non-metallic product from said aqueous solution, the non-metallic product comprised of 40 to 75 wt. % $Al_2O_3$, 3 to 12 wt. % $SiO_2$, and 0 to 18 wt. % MgO, the non-metallic product having less than 1 wt. % each of aluminum nitride and aluminum metal and having an LOI of 5 to 35 wt. % water at 1400° C.;

(e) adding a source of calcium oxide to said body to provide a blend comprised of 30 to 70 wt. % non-metallic product, the remainder said source of calcium oxide;

(f) adding up to 30 wt. % water to said blend to provide a mix;

(g) forming said mix into discrete bodies;

(h) preheating said discrete bodies to increase green body strength; and (i) heating said preheated bodies to a temperature in the range of about 1093° to 1193° C. to form said calcium aluminate product.

20. The process in accordance with claim 19 including adding a binder to said blend, said binder selected from the group consisting of sodium lignosulfate, calcium lignosulfate and clay.

* * * * *